United States Patent
Okui et al.

(10) Patent No.: US 6,556,459 B2
(45) Date of Patent: Apr. 29, 2003

(54) UNINTERRUPTIBLE POWER SUPPLY AND METHOD OF TURNING OFF AC SWITCH FOR UNINTERRUPTIBLE POWER SUPPLY

(75) Inventors: Yoshiaki Okui, Nagano (JP); Minoru Yanagisawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/180,692

(22) Filed: Jun. 26, 2002

(65) Prior Publication Data

US 2002/0195879 A1 Dec. 26, 2002

(30) Foreign Application Priority Data

Jun. 26, 2001 (JP) ........................................ 2001-193357

(51) Int. Cl.[7] ........................... H02M 5/45; H02M 5/458
(52) U.S. Cl. ........................ 363/37; 363/98; 363/56.02; 363/58; 387/64; 387/68
(58) Field of Search .............................. 307/64, 66, 68; 363/37, 136, 56.02, 98, 132, 58

(56) References Cited

U.S. PATENT DOCUMENTS

| | | | |
|---|---|---|---|
| 5,111,374 A | * | 5/1992 | Lai et al. ........................ 363/37 |
| 5,111,376 A | * | 5/1992 | Mehl ............................ 363/71 |
| 6,160,722 A | * | 12/2000 | Thommes et al. ............. 363/37 |

FOREIGN PATENT DOCUMENTS

| | | |
|---|---|---|
| JP | 05-030683 | 2/1993 |
| JP | 05-176461 | 7/1993 |
| JP | 05-292686 | 11/1993 |

* cited by examiner

Primary Examiner—Bao Q. Vu
(74) Attorney, Agent, or Firm—Rankin, Hill, Porter & Clark LLP

(57) ABSTRACT

An uninterruptible power supply is provided that is capable of turning off an AC switch made up of thyristors as quickly as possible by using a power converter. A power is supplied from the utility power supply 3 to the load 9 through the AC switch 1 made up of antiparallelly connected thyristors. Under this condition, in the event that the power failure detection means 12 detects a power outage, if the current detection means 11a detects a current of a positive polarity, the reference sinusoidal voltage generation circuit 11 generates the high synchronous sinusoidal voltage Vref2 which is higher, by the voltage difference command value ΔV, than the synchronous sinusoidal voltage Vref1 in phase with the utility power supply. If the current detection means 11a detects a current of a negative polarity, the reference sinusoidal voltage generation circuit 11 generates the low synchronous sinusoidal voltage Vref3 which is lower than the synchronous sinusoidal voltage Vref1 by the voltage difference command value ΔV. As a result, the power converter 5 produces an output voltage that applies to a conducting thyristor a reverse bias voltage that reverse-biases the line 17b on one side of the AC switch 1 with respect to the line 17a on the other side.

12 Claims, 8 Drawing Sheets

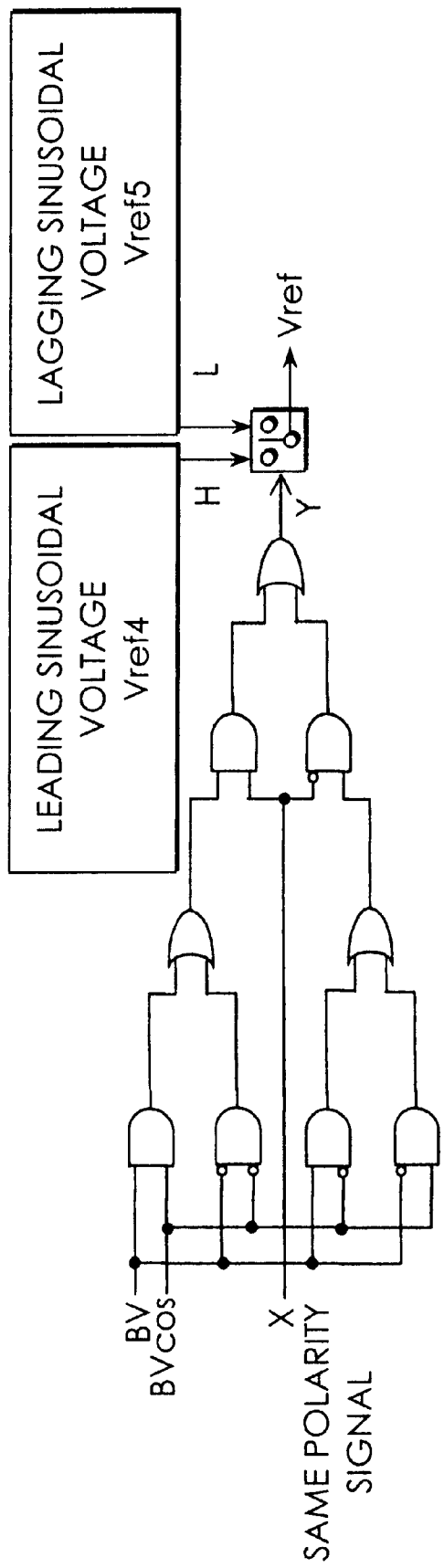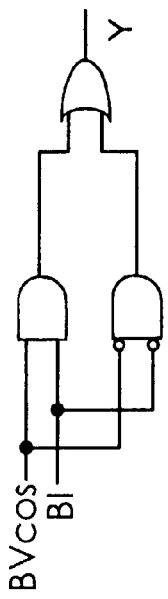
FIG.7A
FIG.7B

UNINTERRUPTIBLE POWER SUPPLY AND METHOD OF TURNING OFF AC SWITCH FOR UNINTERRUPTIBLE POWER SUPPLY

BACKGROUND OF THE INVENTION

The present invention relates to an uninterruptible power supply which connects a load to utility power supply through an AC switch.

AC switches used in conventional uninterruptible power supplies, as disclosed in Japanese Patent Laid-Open No. 5-292686, employ switching element with a self turn-off function or thyristors that are turned off by a forced turn-off circuit.

Another type of AC switch is also used which does not use a turn-off circuit and is naturally turned off as a current flowing in the thyristor falls below a holding current. The use of the AC switch incorporating only such thyristors can reduce the cost of the uninterruptible power supply. However, when this kind of AC switch is used, a period occurs without fail during which two AC powers are parallelly connected to and fed to a load, delaying the turn-off of the AC switch, as indicated in Japanese Patent Laid-Open Nos. 5-30683, 5-176461 and 5-292686.

As shown in FIG. 8A, a conventional thyristor-based AC switch 1 for each phase has antiparallelly connected thyristors SCR1 and SCR2 disposed between a utility or commercial power supply 3 and a power converter 5 for each phase. The power converter 5 has a function of converting an AC power into a DC power and vice versa, and is connected to a DC power supply 7 on a DC side thereof. The electric power from the utility power supply 3 is fed through the AC switch 1 to a load 9, and the output from the power converter 5 is supplied directly to the load 9.

To initiate a switchover between the two power supplies 3, 7, from the power converter 5 side (second feeding path R2) to the utility power supply 3 side (first feeding path R1), an ON signal is applied to each of the thyristors SCR1 and SCR2 making up the AC switch 1 at a predetermined cycle and an OFF signal is given to the power converter 5. At this time the current flowing through the power converter 5 is immediately interrupted and the AC switch immediately turns on, causing the feeding path to be changed over instantaneously.

To switch the feeding path from the utility power supply side (first feeding path R1) to the power converter side (second feeding path R2), an ON signal is applied to the power converter 5 and an OFF signal is supplied to the AC switch 1. However, since the AC switch 1 uses thyristors without the self turn-off function, the current flowing through the AC switch 1 does not fall immediately to zero and thus there is a period when the utility power supply 3 and the power converter 5 are connected parallelly to the load 9. During this period, depending on the voltage relation between the utility power supply 3 and the power converter 5, an uncontrollable cross current flows between the power converter 5 and the utility power supply 3, rendering the voltage applied to the load 9 abnormal. The inexpensive AC switch 1 comprising only the thyristors SCR1 and SCR2 that do not use a forced turn-off circuit, therefore, has a problem that it cannot make an instantaneous switchover of the feeding path.

An object of the present invention is to provide an uninterruptible power supply capable of turning off an AC switch made up of thyristors as quickly as possible.

Another object of the present invention is to provide an uninterruptible power supply capable of turning off an AC switch made up of thyristors as quickly as possible by using a power converter.

Still another object of the present invention is to provide an uninterruptible power supply capable of turning off an AC switch made up of thyristors without providing a separate, forced turn-off circuit.

Yet another object of the present invention is to provide an AC switch turn-off method for an uninterruptible power supply capable of turning off an AC switch made up of thyristors without providing a separate, forced turn-off circuit.

SUMMARY OF THE INVENTION

The present invention improves an uninterruptible power supply which comprises: a first feeding path to feed an AC power to a load from a utility power supply through an AC switch made up of a pair of antiparallelly connected thyristors; a second feeding path including a voltage control type power converter, the power converter using a DC power supply as its source and performing an inverter operation of converting a DC power into an AC power and feeding the converted AC power to the load; a reference sinusoidal voltage generation circuit to produce a reference sinusoidal voltage; a control command generation means to, based on the reference sinusoidal voltage, output to the power converter a voltage control command to cause the power converter to perform the inverter operation, wherein, while the voltage control command is being output from the control command generation means, the AC switch is turned off and the feeding of the AC power to the load is switched over from the first feeding path to the second feeding path. The AC switch is arranged for each phase. Thus, for a three-phase AC power, three single-phase AC switches are provided, one for each phase.

In the uninterruptible power supply of the present invention, the reference sinusoidal voltage generation circuit includes: a sinusoidal voltage generation means to generate a synchronous sinusoidal voltage Vref1, a high synchronous sinusoidal voltage Vref2 and a low synchronous sinusoidal voltage Vref3, wherein the synchronous sinusoidal voltage Vref1 is synchronized with the utility power supply and, when used as the reference sinusoidal voltage, causes an output voltage of the power converter to become almost equal to a voltage of the utility power supply, the high synchronous sinusoidal voltage Vref2 is in phase with the synchronous sinusoidal voltage Vref1 and higher in amplitude than the synchronous sinusoidal voltage Vref1, and the low synchronous sinusoidal voltage Vref3 is in phase with the synchronous sinusoidal voltage Vref1 and lower in amplitude than the synchronous sinusoidal voltage Vref1; a current detection means to detect a current flowing through the AC switch; and a sinusoidal voltage selection means to select the synchronous sinusoidal voltage Vref1, the high synchronous sinusoidal voltage Vref2 or the low synchronous sinusoidal voltage Vref3 and output the selected voltage as the reference sinusoidal voltage to the control command generation means, wherein when the voltage control command is not output, the sinusoidal voltage selection means selects the synchronous sinusoidal voltage Vref1 and wherein when the voltage control command is output, the sinusoidal voltage selection means selects the high synchronous sinusoidal voltage Vref2 if an output of the current detection means has a positive polarity, selects the low synchronous sinusoidal voltage Vref3 if the output of the current detection means has a negative polarity, and selects the synchronous sinusoidal voltage Vref1 if the output of the current detection means is zero.

In the uninterruptible power supply of the present invention, the reference sinusoidal voltage generation circuit includes: a sinusoidal voltage generation means to generate a synchronous sinusoidal voltage Vref1, a high synchronous sinusoidal voltage Vref2 and a low synchronous sinusoidal voltage Vref3, wherein the synchronous sinusoidal voltage Vref1 is synchronized with the utility power supply and, when used as the reference sinusoidal voltage, causes an output voltage of the power converter to become almost equal to a voltage of the utility power supply, the high synchronous sinusoidal voltage Vref2 is in phase with the synchronous sinusoidal voltage Vref1 and higher in amplitude than the synchronous sinusoidal voltage Vref1, and the low synchronous sinusoidal voltage Vref3 is in phase with the synchronous sinusoidal voltage Vref1 and lower in amplitude than the synchronous sinusoidal voltage Vref1; a current detection means to detect a current flowing through the AC switch; and a sinusoidal voltage selection means to select the synchronous sinusoidal voltage Vref1, the high synchronous sinusoidal voltage Vref2 or the low synchronous sinusoidal voltage Vref3 and output the selected voltage as the reference sinusoidal voltage to the control command generation means, wherein when the power failure detection means does not detect a power failure and the voltage control command is not output, the sinusoidal voltage selection means selects the synchronous sinusoidal voltage Vref1 and wherein when the power failure detection means detects a power failure and the voltage control command is output, the sinusoidal voltage selection means selects the high synchronous sinusoidal voltage Vref2 if an output of the current detection means has a positive polarity, selects the low synchronous sinusoidal voltage Vref3 if the output of the current detection means has a negative polarity, and selects the synchronous sinusoidal voltage Vref1 if the output of the current detection means is zero.

According to the present invention, when the first feeding path is switched over to the second switching path, the reference sinusoidal voltage generation circuit generates a reference sinusoidal voltage that causes the output voltage of the power converter in the second feeding path to apply a reverse bias to the conducting one of the thyristors making up the AC switch in the first feeding path. Hence, the AC switch can be turned off quickly without providing a forced turn-off circuit for the thyristors. Particularly, with this invention, when the AC switch is turned off, no period exists during which the utility power supply and the power converter are connected in parallel, thus ensuring that no cross current flows between the utility power supply and the power converter.

The present invention can also be applied to a normally utility power type uninterruptible power supply which normally supplies electric power to the load through the first feeding path and, in the event a failure of the utility power supply, switches the power feeding from the first feeding path to the second feeding path. In that case, the control command generation means outputs a voltage control command while the utility power failure persists.

The present invention can also be applied to a normally utility power feeding and active filter type uninterruptible power supply which normally supplies power to the load through the first feeding path and operates the power converter as an active filter and, in the event a failure of the utility power supply, switches the power feeding from the first feeding path to the second feeding path. In that case, the control command generation means is made to output a voltage control command to the power converter while the power failure persists in the utility power supply and, when there is no power failure in the utility power supply, output to the power converter a current control command that causes it to operate as an active filter.

The present invention can also be applied to a normally inverter type uninterruptible power supply which normally supplies electric power to the load through the second feeding path and, when the power converter is abnormal, switches the feeding from the second feeding path to the first feeding path. In that case, the control command generation means is made to output a voltage control command at all times when the power converter is normal. When the power converter is abnormal, the AC switch is turned on. In this type of uninterruptible power supply, when the power converter is restored or repaired from the abnormal condition and the first feeding path is switched over to the second feeding path, the control command generation means generates a voltage control command.

The present invention also improves an uninterruptible power supply which comprises: a power failure detection means to detect a power failure in a utility power supply; an AC switch having a pair of antiparallelly connected thyristors, the AC switch being adapted to conduct to feed an AC power from the utility power supply to a load when the utility power supply is normal and, when the utility power supply fails, turn off; a DC power supply; a voltage control type power converter arranged between the AC switch and the DC power supply, wherein when the utility power supply is normal, the power converter performs a rectifier operation of converting the AC power from the utility power supply into a DC power and charging the DC power supply with the DC power and an active filter operation of compensating for a harmonic current and a reactive current flowing into the load and wherein at other times the power converter uses the DC power supply as its source and performs mainly an inverter operation of converting a DC power into an AC power and feeding the converted AC power to the load; a reference sinusoidal voltage generation circuit to produce a reference sinusoidal voltage; and a control command generation means to, based on the reference sinusoidal voltage, output to the power converter a voltage control command to cause the power converter to perform the inverter operation and a current control command to cause the power converter to perform the rectifier operation and the active filter operation.

The sinusoidal voltage generation means may have, but is not limited to, a configuration in which it generates the synchronous sinusoidal voltage Vref1, a high synchronous sinusoidal voltage Vref2 in phase with and a voltage difference command value $\Delta V$ higher than the synchronous sinusoidal voltage Vref1, and a low synchronous sinusoidal voltage Vref3 in phase with and a voltage difference command value $\Delta V$ lower than the synchronous sinusoidal voltage Vref1. This arrangement can easily produce sinusoidal voltages required for various controls. In particular, this arrangement can reliably determine the necessary reverse bias voltage by the voltage difference command value $\Delta V$, so it is possible to output from the power converter a minimum voltage required to turn off the thyristor at whatever timing the AC switch is to be turned off.

The sinusoidal voltage selection means may also be constructed to have a first selection circuit to select the high synchronous sinusoidal voltage Vref2 when the output of the current detection means has a positive polarity and the low synchronous sinusoidal voltage Vref3 when the output of the current detection means has a negative polarity; a first decision circuit to decide that the output voltage of the first selection circuit is required as the reference sinusoidal voltage when the power failure detection means detects a power failure and the current detection means detects that the current is not zero; and a second selection circuit to select the output voltage of the first selection circuit when the first decision circuit decides that the output voltage of the first selection circuit is required and, at other times, select the synchronous sinusoidal voltage Vref1. In this arrangement, the necessary sinusoidal voltage can reliably be selected with a few selection circuits.

In the invention described above, three kinds of sinusoidal voltages Vref1–Vref3 are the same in phase with each other are used to generate a reference sinusoidal voltage that causes the power converter to produce a reverse bias voltage to be applied to the thyristors making up the AC switch. It is also possible to use three kinds of sinusoidal voltages different in phase from one another to generate a reverse bias voltage. In this invention, the uninterruptible power supply comprises: a power failure detection means to detect a power failure in a utility power supply; an AC switch having a pair of antiparallelly connected thyristors, the AC switch being adapted to conduct to feed an AC power from the utility power supply to a load when the utility power supply is normal and, when the utility power supply fails, turn off; a DC power supply; a voltage control type power converter arranged between the AC switch and the DC power supply, wherein when the utility power supply is normal, the power converter performs a rectifier operation of converting the AC power from the utility power supply into a DC power and charging the DC power supply with the DC power and an active filter operation of compensating for a harmonic current and a reactive current flowing into the load and wherein at other times the power converter uses the DC power supply as its source and performs mainly an inverter operation of converting a DC power into an AC power and feeding the converted AC power to the load; a phase shift type reference sinusoidal voltage generation circuit to produce a reference sinusoidal voltage; and a control command generation means to, based on the reference sinusoidal voltage, output to the power converter a voltage control command to cause the power converter to perform the inverter operation and a current control command to cause the power converter to perform the rectifier operation and the active filter operation.

The AC switch comprises a pair of antiparallelly connected thyristors. This invention uses the phase shift type reference sinusoidal voltage generation circuit to generate three kinds of sinusoidal voltages different in phase from one another. The phase shift type reference sinusoidal voltage generation circuit comprises: a phase shift type sinusoidal voltage generation means to generate a synchronous sinusoidal voltage Vref1, a leading sinusoidal voltage Vref4 and a lagging sinusoidal voltage Vref5, wherein the synchronous sinusoidal voltage Vref1 is synchronized with the utility power supply and, when used as the reference sinusoidal voltage, causes an output voltage of the power converter to become almost equal in amplitude to a voltage of the utility power supply, the leading sinusoidal voltage Vref4 is equal in amplitude to and leading in phase the synchronous sinusoidal voltage Vref1, and the lagging sinusoidal voltage Vref5 is equal in amplitude to and lagging in phase the synchronous sinusoidal voltage Vref1; a current detection means to detect a current flowing through the AC switch; and a phase shift type sinusoidal voltage selection means to select the synchronous sinusoidal voltage Vref1, the leading sinusoidal voltage or the lagging sinusoidal voltage and output the selected voltage as the reference sinusoidal voltage to the control command generation means, wherein when the power failure detection means does not detect a power failure and the voltage control command is not output, the phase shift type sinusoidal voltage selection means selects the synchronous sinusoidal voltage Vref1 and wherein when the power failure detection means detects a power failure and the voltage control command is output, the phase shift type sinusoidal voltage selection means selects the leading sinusoidal voltage or the lagging sinusoidal voltage, whichever is larger than the synchronous sinusoidal voltage if an output of the current detection means has a positive polarity, selects the leading sinusoidal voltage or the lagging sinusoidal voltage, whichever is smaller than the synchronous sinusoidal voltage the if the output of the current detection means has a negative polarity, and selects the synchronous sinusoidal voltage Vref1 if the output of the current detection means is zero.

As described above, even if sinusoidal voltages different in phase are selected to generate a reverse bias voltage from the power converter, the thyristors forming the AC switch can be turned off in a short time. In this invention, there is a period in which the leading sinusoidal voltage Vref4 and the lagging sinusoidal voltage Vref5 are both smaller in absolute value than the synchronous sinusoidal voltage Vref1. But this period is very short and, once this period is passed, either of the leading sinusoidal voltage Vref4 or the lagging sinusoidal voltage Vref5 becomes larger in absolute value than the synchronous sinusoidal voltage Vref1 without fail. Thus, if a power failure should occur in this short period, the AC switch can be turned off with only a small time delay. Therefore no practical problem arises with this invention.

The phase shift type sinusoidal voltage generation means may be configured to produce the synchronous sinusoidal voltage Vref1, the leading sinusoidal voltage Vref4 equal in amplitude to and leading in phase the synchronous sinusoidal voltage Vref1 by a phase difference command value $\Delta\phi$, and the lagging sinusoidal voltage Vref5 equal in amplitude to and lagging in phase the synchronous sinusoidal voltage Vref1 by the phase difference command value $\Delta\phi$. With the phase shift type sinusoidal voltage generation means arranged in this way, a required reverse bias voltage can easily be set by setting the phase difference command value $\Delta\phi$ at a desired value.

The phase shift type sinusoidal voltage selection means selects the leading sinusoidal voltage Vref4, the lagging sinusoidal voltage Vref5 or the synchronous sinusoidal voltage Vref1 and outputs the selected voltage as the reference sinusoidal voltage to the control command generation means, wherein the phase shift type sinusoidal voltage selection means selects the leading sinusoidal voltage Vref4 after the current has changed from the negative polarity to the positive polarity until the synchronous sinusoidal voltage Vref1 reaches a positive peak value, selects the lagging sinusoidal voltage Vref5 after the synchronous sinusoidal voltage has reached the positive peak value until the current changes from the positive polarity to the negative polarity, selects the leading sinusoidal voltage Vref4 after the current has changed from the positive polarity to the negative polarity until the synchronous sinusoidal voltage reaches a negative peak value, selects the lagging sinusoidal voltage Vref5 after the synchronous sinusoidal voltage has reached the negative peak value until the current changes from the negative polarity to the positive polarity, and selects the synchronous sinusoidal voltage Vref1 when the current detection means detects that the current is zero.

The present invention also relates to an AC switch turn-off method for an uninterruptible power supply, wherein the uninterruptible power supply has a first feeding path to feed an AC power to a load from a utility power supply through an AC switch made up of a pair of antiparallelly connected thyristors and a second feeding path including a voltage control type power converter, the power converter using a DC power supply as its source and performing an inverter operation of converting a DC power into an AC power and feeding the converted AC power to the load. In this invention, when the power feeding to the load is switched over from the first feeding path to the second feeding path, a reverse bias voltage from the power converter is applied to a conducting one of the thyristors to forcibly turn off the conducting thyristor. With this, the AC switch can be turned off quickly without providing a forced thyristor turn-off circuit.

Other objects and further features of the present invention will be apparent from the following detailed description when read in conjunction with the accompanying drawings.

BRIEF DESCRIPTION OF THE DRAWINGS

FIGS. 7A and 7B are detailed logic diagrams of a first selection circuit of the second embodiment.

DETAILED DESCRIPTION OF THE PREFERRED EMBODIMENTS

Figure 1:
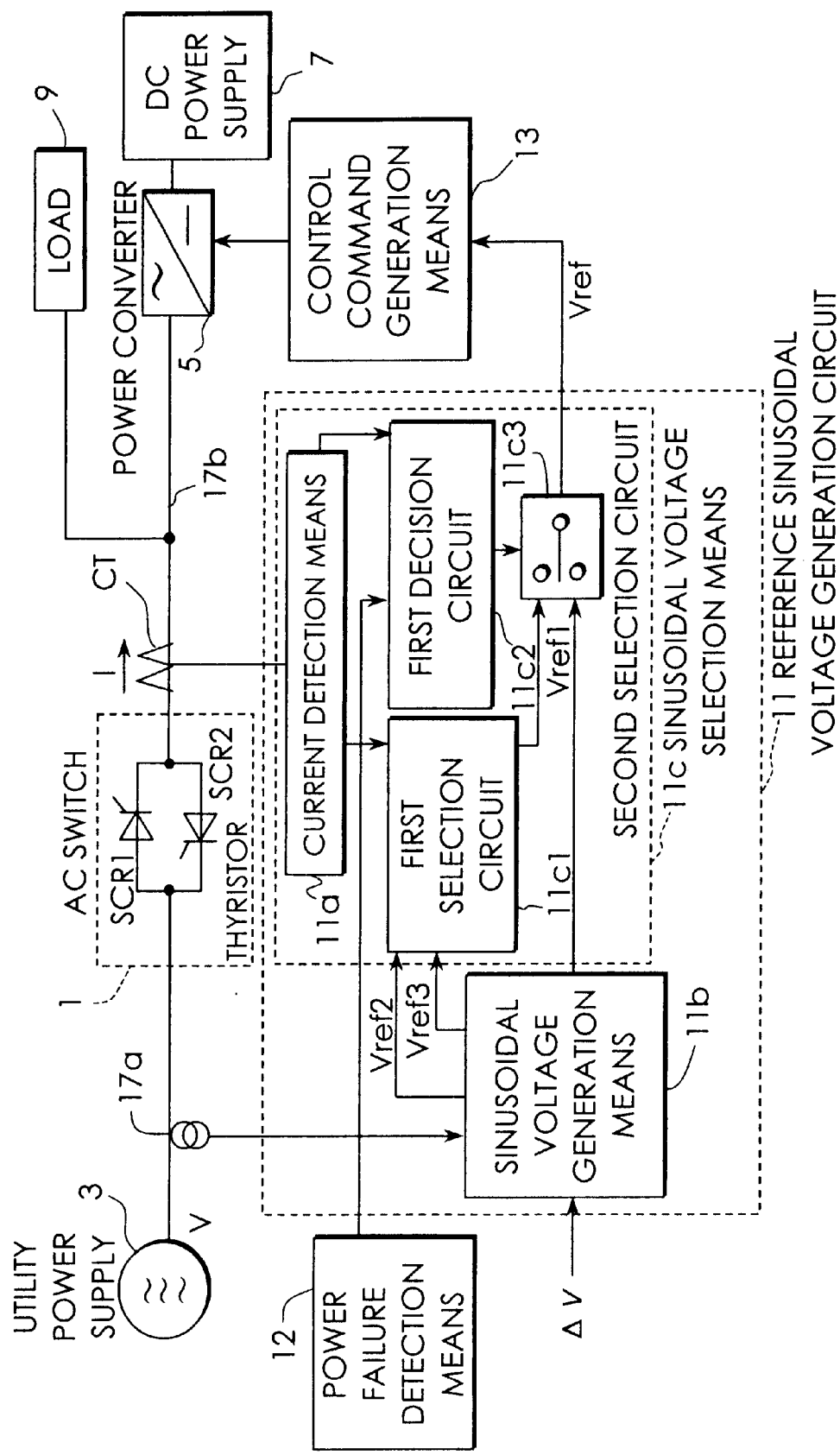
FIG. 1 is a control block diagram of a first embodiment of the present invention.
Figure 8A:
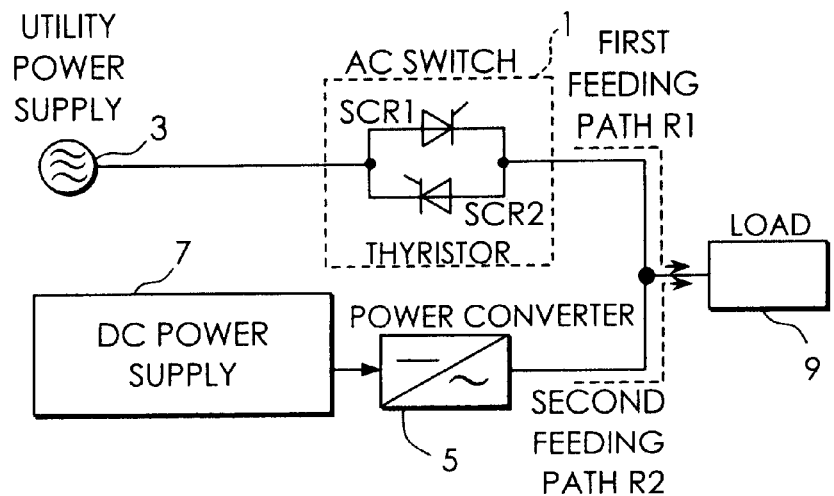
FIGS. 8A, 8B, and 8C are diagrams showing configurations of uninterruptible power supplies to which the present invention can be applied.

One example embodiment of the present invention will be described in detail by referring to the accompanying drawings. FIG. 1 is a circuit block diagram schematically showing one example configuration in which the present invention is applied to an uninterruptible power supply of normally utility power and active filter type. FIG. 1 shows only a single phase component, i.e., connections and a control system for one phase. In FIG. 1, an AC switch 1, a voltage control type power converter 5 and a DC power supply 7 are basically the same as the conventional ones. The voltage control type power converter 5 is installed between the AC switch 1 and the DC power supply 7. When the utility power is normal, the power converter 5 performs a rectifier operation in which it converts an AC power from a three-phase AC utility power supply 3 into a DC power and charges the DC power supply 7 with the rectified DC power and also an active filter operation that generates currents to compensate for a harmonic current and a reactive current flowing into the load 9. At other times, the power converter 5 performs mainly an inverter operation in which it converts a DC power from the DC power supply 7 into an AC power and supplies the inverted AC power to the load 9. As shown in FIG. 8A, the load 9 is supplied from the utility power supply 3 through the first feeding path R1 during the rectifier operation and, during the inverter operation, from the power converter 5 through the second feeding path R2.

The AC switch 1 installed between the utility power supply 3 and the power converter 5 corresponds to one phase and comprises two antiparallelly connected thyristors SCR1 and SCR2. When the utility power supply 3 is normal, the load 9 is supplied with an AC power from the utility power supply 3 through the AC switch 1. When the utility power supply 3 fails, the AC switch 1 is opened to stop supplying the AC power from the utility power supply 3 to the load 9.

When a power failure detection means 12 detects the presence or absence of a power failure, a reference sinusoidal voltage generation circuit 11 outputs a reference sine wave signal for controlling the power converter 5 to a control command generation means 13. Based on the reference sinusoidal voltage, the control command generation means 13 outputs to the power converter 5 a voltage control command for having the power converter 5 perform the inverter operation and a current control command for having the power converter 5 perform the rectifier operation and the active filter operation. The power failure detection means 12 may, for example, have a known configuration which determines the occurrence of a power failure when a voltage detection circuit detects that a voltage of one phase is lower than a predetermined voltage. Although in this example only the output of the reference sinusoidal voltage generation circuit 11 is shown to be an input to the control command generation means 13, the control command generation means 13 actually receives signals representing information necessary for the control of the voltage and current on the AC side of the power converter 5 and the DC voltage on the DC side. The configurations of the power converter 5 and the control command generation means 13 are disclosed in Japanese Patent Laid-Open Nos. 8-51735, 9-56087 and 10-14251 and also detailed in Japanese Patent Application 2000-288480 (U.S. Ser. No. 09/956,185, EP Application No. 01250328.0), a previous application by this applicant.

The reference sinusoidal voltage generation circuit 11 comprises a current detection means 11a for detecting a current flowing through the AC switch 1, a sinusoidal voltage generation means 11b for generating a sine wave voltage to be output as the reference sinusoidal voltage to the control command generation means 13, and a sinusoidal voltage selection means 11c for selecting a sine wave voltage to be output as the reference sinusoidal voltage to the control command generation means 13. The current detection means 11a, based on an analog current value detected by a current transformer CT, outputs a current detection signal necessary for the control.

The sinusoidal voltage generation means 11b generates a synchronous sinusoidal voltage Vref1, a high synchronous sinusoidal voltage Vref2, and a low synchronous sinusoidal voltage Vref3. The synchronous sinusoidal voltage Vref1 is synchronized with the utility power supply 3 and, when used as the reference sinusoidal voltage, causes the output voltage of the power converter 5 to be almost equal to the voltage of the utility power supply 3. The high synchronous sinusoidal voltage Vref2 is in phase with the synchronous sinusoidal voltage Vref1 and larger in amplitude than the synchronous sinusoidal voltage Vref1. The low synchronous sinusoidal voltage Vref3 is in phase with the synchronous sinusoidal voltage Vref1 and smaller in amplitude than the synchronous sinusoidal voltage Vref1. When these sinusoidal voltages are used as a reference sinusoidal voltage Vref, the output voltage of the power converter 5 appears on a line 17b of FIG. 1. If the synchronous sinusoidal voltage Vref1 is used as the reference sinusoidal voltage Vref, an AC output equal in phase and amplitude to the AC voltage of the utility power supply 3 is produced on the line 17b. The sinusoidal voltage selection means 11e selects the synchronous sinusoidal voltage Vref1 when the power failure detection means 12 does not detect a power outage or a power failure. In the event that the power failure detection means 12 detects the power outage or the power failure, the sinusoidal voltage selection means 11c selects the high synchronous sinusoidal voltage Vref2 when the output of the current detection means 11a has a positive polarity, the low synchronous sinusoidal voltage Vref3 when the output of the current detection means 11a has a negative polarity, and the synchronous sinusoidal voltage Vref1 when the output of the current detection means 11a is zero, before outputting the selected sinusoidal voltage as the reference sinusoidal voltage to the control command generation means 13. When the reference sinusoidal voltage generation circuit 11 selects the high synchronous sinusoidal voltage Vref2 or low synchronous sinusoidal voltage Vref3, the conducting thyristor SCR1 or SCR2 of the AC switch 1 is applied a reverse bias and turned off. After the current-carrying thyristor has been turned off, when the reference sinusoidal voltage generation circuit 11 selects the synchronous sinusoidal voltage Vref1 as the reference sinusoidal voltage, the AC switch 1 remains turned off and the power converter 5 starts the inverter operation. When the power failure detection means 12 does not detect the power outage, the reference sinusoidal voltage generation circuit 11 outputs the synchronous sinusoidal voltage Vref1. Using the synchronous sinusoidal voltage Vref1 as its input, the control command generation means 13 performs an active filter operation. This operation is detailed in the previous application and thus its explanation is omitted here.

Figure 2:
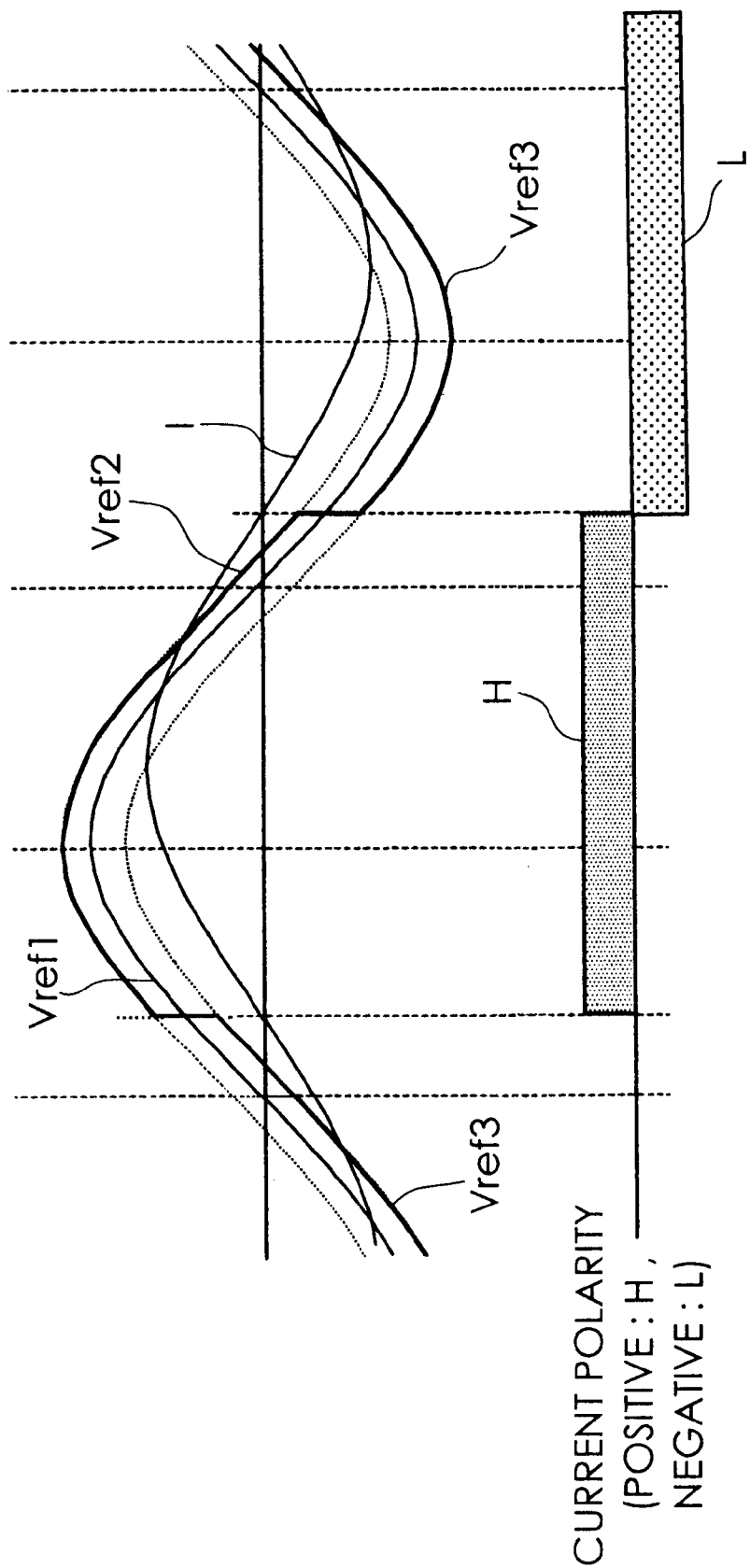
FIG. 2 is an operation waveform diagram of the first embodiment of the present invention.

The sinusoidal voltage generation means 11b in this example generates the high synchronous sinusoidal voltage Vref2 by adding a voltage difference command value ΔV to the synchronous sinusoidal voltage Vref1 synchronized with the utility power supply 3, and the low synchronous sinusoidal voltage Vref3 by subtracting the voltage difference command value ΔV from the synchronous sinusoidal voltage Vref1. The voltage difference command value ΔV is preset based on thyristor characteristics to produce a reverse bias voltage that can reliably effect a turn-off. FIG. 2 shows waveforms of the synchronous sinusoidal voltage Vref1, the high synchronous sinusoidal voltage Vref2 and the low synchronous sinusoidal voltage Vref3 and a waveform of an AC current I. Since the load is inductive, the waveform of the AC current I lags the synchronous sinusoidal voltage Vref1. The sinusoidal voltage output from the reference sinusoidal voltage generation circuit 11 can be expressed as follows.

$$Vref=Vref1+\Delta V \cdot sign(I) \cdot S \quad (1)$$

Here, when $I>0, sign(I)=1, Vref=Vref2$ (2)

when $I<0, sign(I)=-1, Vref=Vref3$ (3)

when $I=0, sign(I)=0, Vref=Vref1$ (4)

Here, symbol I is assumed to be a current value as detected by the current detection means 11a. When the power failure detection means 12 detects no power outage, it is assumed that S=0. At this time, the reference sinusoidal voltage Vref is the synchronous sinusoidal voltage Vref1, making the voltage of the line 17b almost equal to the voltage of the utility power supply 3. The conducting thyristor of the AC switch 1 remains turned on. When the power failure detection means 12 detects a power outage, S is assumed to be S=1. At this time, depending on the polarity of the current I, equation (2) or (3) holds for the reference sinusoidal voltage Vref of equation (1). When the power failure detection means 12 detects a power outage, the reference sinusoidal voltage Vref switches from the synchronous sinusoidal voltage Vref1 to the synchronous sinusoidal voltage indicated by a thick line in the graph of FIG. 2. When the current I detected by the current detection means 11a is zero, the reference sinusoidal voltage Vref in equation (1) returns to the synchronous sinusoidal voltage Vref1.

Figure 4A:
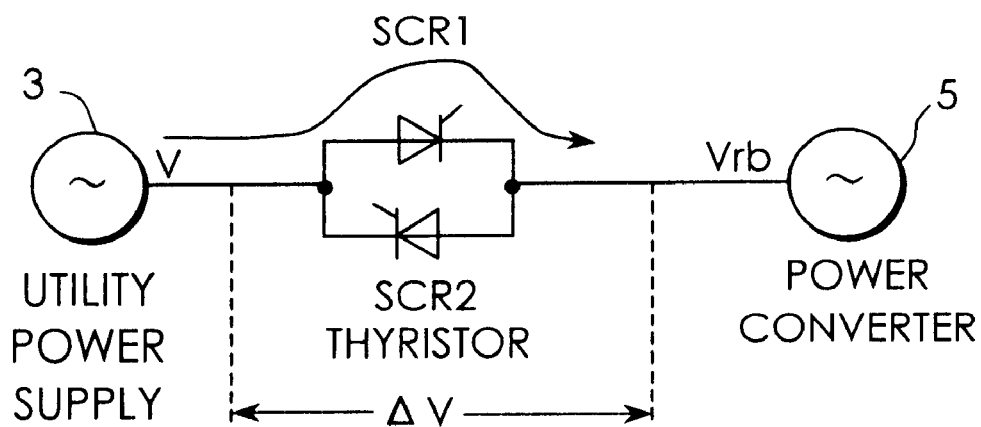
FIG. 4 is a diagram showing changes over time of current and voltage in this invention when a power failure is detected.
Figure 4B:
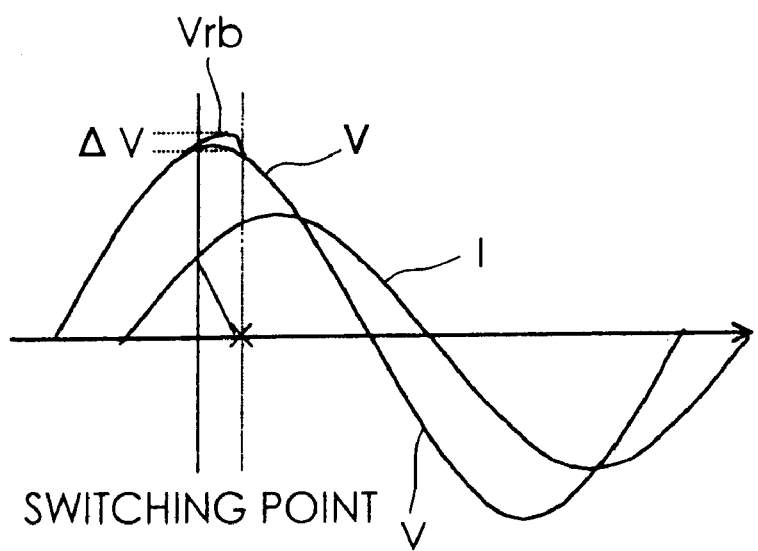

If the current detection means 11a detects a positive current, the current is flowing through the antiparallelly connected thyristor SCR1, as shown in FIG. 4A. At this time, since the high synchronous sinusoidal voltage Vref2, higher in amplitude than the synchronous sinusoidal voltage Vref1, is selected as the reference sinusoidal voltage Vref, the line 17b is applied a voltage Vrb, which is ΔV higher than the voltage V of the utility power supply 3, and the thyristor SCR1 is impressed with a reverse bias of ΔV, causing the current I to drop to zero. FIG. 4B shows how the voltage and current waveforms change over time in this situation. As shown in FIG. 4B, starting at the switching point the voltage on the line 17b rises from V to Vrb and the reverse bias ΔV is applied to the thyristor, causing the current I in the thyristor to quickly fall to zero. When the thyristor is turned off and the current I is zero (at a point marked with X in FIG. 4B), the synchronous sinusoidal voltage Vref1 is selected as the reference sinusoidal voltage Vref, the terminal voltage of the load 9 connected to the line 17b is restored to the utility power voltage V, and the bias voltage between the lines 17a and 17b on both sides of the AC switch 1 become zero. What has been discussed here is expressed by equation (1) because even when S=1, Vref=Vref1 holds if I=0. If Vref=Vref1, then the AC switch 1 continues to be turned off. In this state, the AC power is fed from the power converter 5 to the load 9.

When the current detection means 11a has a negative polarity, the sinusoidal voltage selection means 11c selects the low synchronous sinusoidal voltage Vref3 as the reference sinusoidal voltage and a reverse bias is applied to the thyristor SCR2, thus interrupting the current flowing through the thyristor SCR2.

Figure 3:
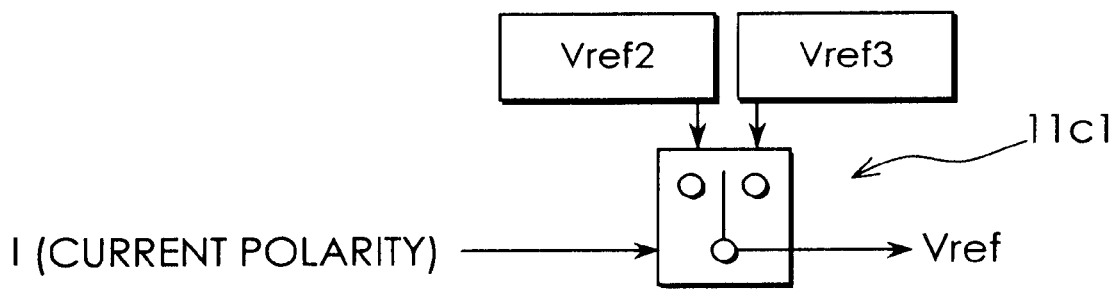
FIG. 3 is a detailed diagram of a first selection circuit used in the first embodiment.

The sinusoidal voltage generation means 11b in the reference sinusoidal voltage generation circuit 11 shown in FIG. 1 produces the synchronous sinusoidal voltage Vref1, the high synchronous sinusoidal voltage Vref2 and the low synchronous sinusoidal voltage Vref3 by using the voltage difference command value ΔV. The sinusoidal voltage generation means 11b may use a PLL circuit for instance. A first selection circuit 11c1 in the sinusoidal voltage selection means 11c selects the high synchronous sinusoidal voltage Vref2 when the output of the current detection means 11a is positive and the low synchronous sinusoidal voltage Vref3 when the output of the current detection means 11a is negative. FIG. 3 shows a detailed configuration of the first selection circuit 11c1. If the power failure detection means 12 detects a power outage and the current detection means 11a finds that the current is not zero, a first decision circuit 11c2 decides that an output voltage of the first selection circuit 11c1 is required as the reference sinusoidal voltage. When a second selection circuit 11c3 receives from the first decision circuit 11c2 a signal indicating that the output voltage of the first selection circuit 11c1 is needed, the second selection circuit 11c3 selects the output voltage of the first selection circuit 11c1. When no such signal is received, the second selection circuit 11c3 selects the synchronous sinusoidal voltage Vref1.

Figure 5:
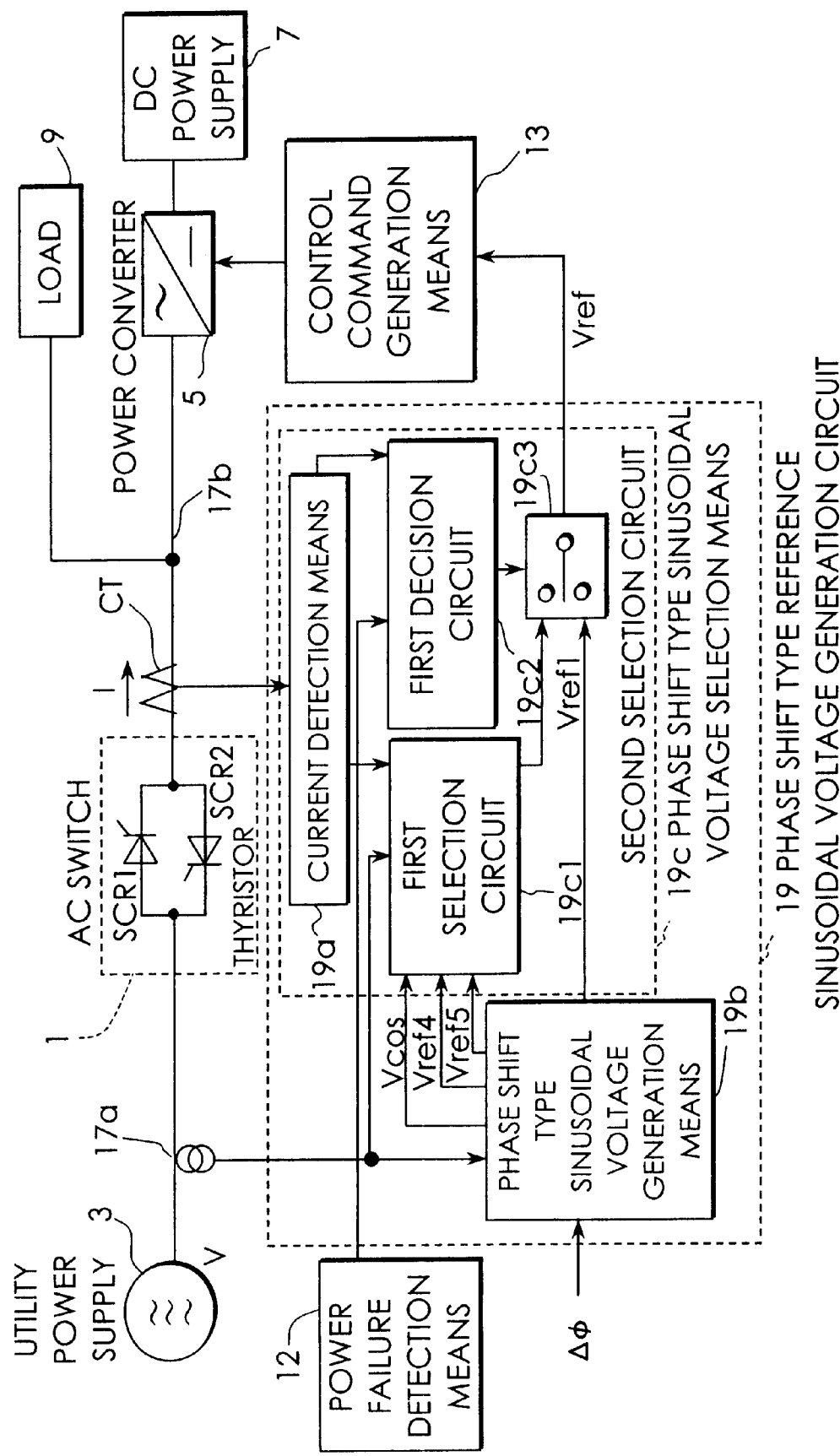
FIG. 5 is a control block diagram of a second embodiment of the present invention.

FIG. 5 is a block diagram showing another embodiment (phase difference method) of the present invention. Parts identical with those of FIG. 1 are assigned like reference numerals. In this example, a phase shift type reference sinusoidal voltage generation circuit 19 is used as the reference sinusoidal voltage generation circuit. The phase shift type reference sinusoidal voltage generation circuit 19 comprises a current detection means 19a for detecting a current flowing through the AC switch 1, a phase shift type sinusoidal voltage generation means 19b, and a phase shift type sinusoidal voltage selection means 19c. The phase shift type sinusoidal voltage generation means 19b generates the synchronous sinusoidal voltage Vref1 used in the first embodiment, a leading sinusoidal voltage Vref4 which is equal in amplitude to and leading in phase the synchronous sinusoidal voltage Vref1, and a lagging sinusoidal voltage Vref5 which is equal in amplitude to and lagging in phase the synchronous sinusoidal voltage Vref1. The phase shift type sinusoidal voltage selection means 19c selects the synchronous sinusoidal voltage Vref1 when the power failure detection means 12 does not detect a power outage. In the event that the power failure detection means 12 detects a power outage, the phase shift type sinusoidal voltage selection means 19c selects the leading sinusoidal voltage Vref4 or the lagging sinusoidal voltage Vref5 whichever is larger in amplitude than the synchronous sinusoidal voltage while the current I is positive. While the current I is negative, the phase shift type sinusoidal voltage selection means 19c selects whichever of the leading and lagging sinusoidal voltages Vref4 and Vref5 is smaller in amplitude than the synchronous sinusoidal voltage. When the output of the current detection means is zero, the phase shift type sinusodial voltage selection means 19c selects the synchronous sinusoidal voltage Vref1. The selected sinusoidal voltage is then output as the reference sinusoidal voltage to the control command generation means 13.

Figure 6:
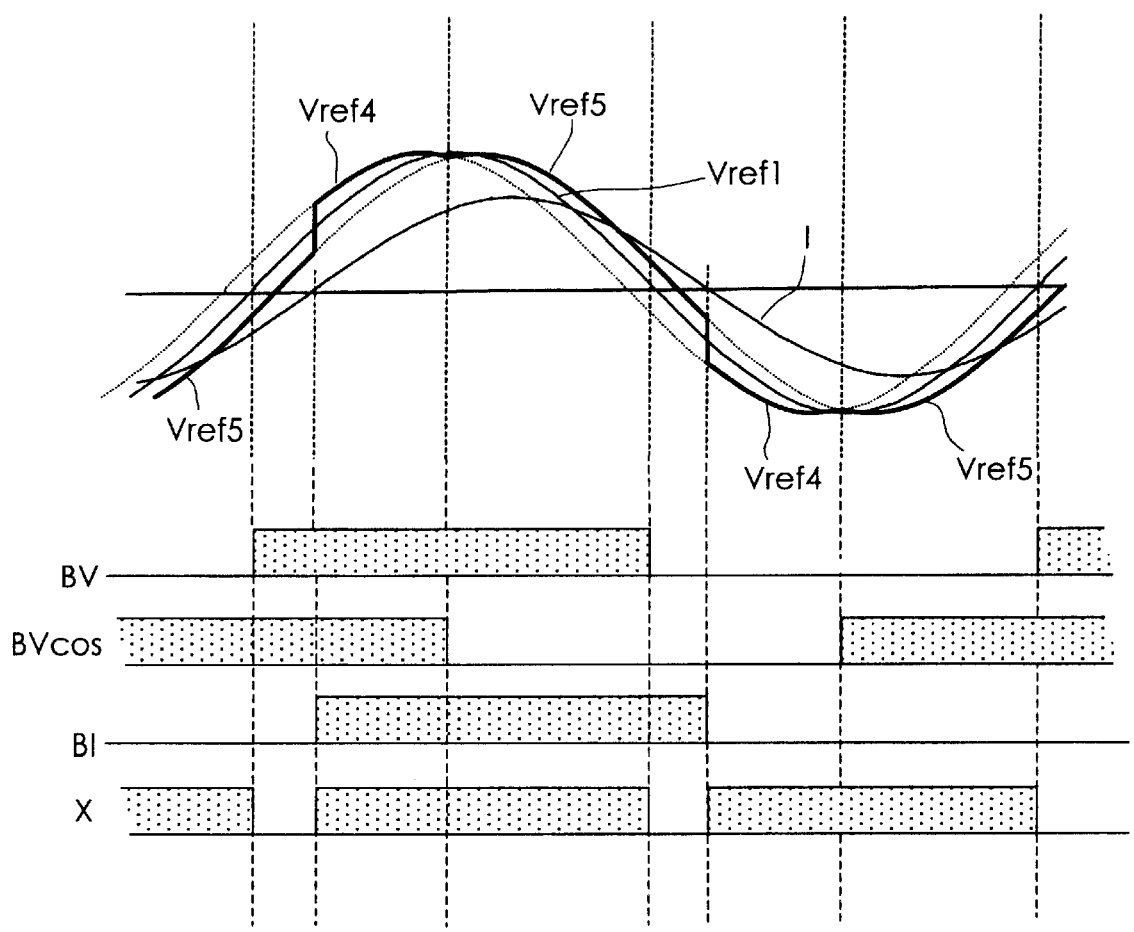
FIG. 6 is an operation waveform diagram of the second embodiment of the present invention.

Next, an example case will be discussed in which the leading sinusoidal voltage Vref4 is equal in amplitude to and leading in phase the synchronous sinusoidal voltage Vref1 by a phase difference command value $\Delta\phi$ and in which the lagging sinusoidal voltage Vref5 is equal in amplitude to and lagging in phase the synchronous sinusoidal voltage Vref1 by the phase difference command value $\Delta\phi$. In this case, the phase shift type sinusoidal voltage generation means 19b generates a cosine wave voltage V cos which leads the synchronous sinusoidal voltage Vref1 by 90 degrees. This cosine wave voltage is used by the phase shift type sinusoidal voltage selection means 19c described later. The operation of the uninterruptible power supply shown in FIG. 5 will be explained with reference to waveforms of FIG. 6. FIG. 6 illustrates waveforms of the synchronous sinusoidal voltage Vref1, the leading sinusoidal voltage Vref4 and the lagging sinusoidal voltage Vref5 and also a waveform of the current I. When the power failure detection means 12 detects a power outage, if a product of the current I detected by the current detection means 19a and the cosine wave voltage V cos has a positive sign, the phase shift type reference sinusoidal voltage generation circuit 19 outputs the leading sinusoidal voltage Vref4 as the reference sinusoidal voltage. If the sign of the product of the current detected by the current detection means 11a and the cosine wave voltage V cos is negative, the phase shift type reference sinusoidal voltage generation circuit 19 outputs the lagging sinusoidal voltage Vref5 as the reference sinusoidal voltage to the load line 17b. A transition of the reference sinusoidal voltage that depends on the product of the current and the cosine wave voltage V cos is shown by a thick line. Comparison in amplitude between the thick line voltage and the synchronous sinusoidal voltage Vref1 synchronized with the utility power supply 3 shows that the voltage applied to the AC switch 1 is reverse-biased with respect to the current. This arrangement causes a reverse bias to be applied to the current-carrying thyristor thus interrupting the current in that thyristor.

What has been discussed above will be explained by using equations. The sinusoidal voltages of FIG. 6 can be expressed as follows.

$$\text{Vref1 } \sin \theta \tag{5}$$

$$\text{Vref4 } \sin(\theta+\Delta\phi) \tag{6}$$

$$\text{Vref5 } \sin(\theta-\Delta\phi) \tag{7}$$

Here, let us assume that $\theta=\omega t$ where $\omega$ is an angular frequency of AC power and t is time. The common amplitudes of the voltages are omitted here. When output as the reference sinusoidal voltage, the synchronous sinusoidal voltage Vref1 matches the voltage on the line 17b in amplitude and phase. $\Delta\phi$ represents a phase shift angle. As shown in FIG. 6, the synchronous sinusoidal voltage Vref1 lies between the leading sinusoidal voltage Vref4 and the lagging sinusoidal voltage Vref5 in most area. Hence, in this area whichever of the leading and lagging sinusoidal voltages is larger, Vref4 or Vref5, is larger than the synchronous sinusoidal voltage Vref1 and whichever is smaller Vref4 or Vref5, is smaller than the synchronous sinusoidal voltage Vref1. Therefore, in an area where $$I\times(\text{Vref4}-\text{Vref5})>0 \tag{8}$$

when I>0, then Vref4>Vref5, Vref4 is selected as the voltage of the line 17b. When I<0, then Vref4<Vref5, thus the lagging sinusoidal voltage Vref5 is chosen as the voltage of the line 17b so that the current-carrying thyristor is applied a reverse bias. The left-hand member of equation (8) can be rewritten as $$I\times(\text{Vref4}-\text{Vref5}) \; 2I\cdot\sin(\Delta\phi)\cdot\cos \theta \tag{9}$$

$$V \cos\cdot I \tag{10}$$

In equation (10) the following is assumed:

$$V \cos \cos \theta \tag{11}$$

The reason that $\sin (\Delta\phi)$ is omitted in transforming the right-hand member of equation (9) into the right-hand member of equation (10) is that, from the definition of the phase difference command value $\Delta\phi$, $\sin (\Delta\phi)>0$ and therefore $\sin (\Delta\phi)$ becomes unnecessary in the following explanation regarding the signs of the right-hand members of equation (9) and equation (10). Using the condition that the left-hand member of equation (9) is larger than 0, the current-carrying thyristor is applied a reverse bias when, from equation (10), $$V \cos\cdot I>0 \tag{12}$$

It should be noted, however, that in a small area of $\theta=(n+1/2)\pi\pm\Delta\phi/2$ where n is an integer, the reverse bias is not produced. Hence in this area, the thyristor cannot be turned off. If we let $$\sin \theta=\sin(\theta\pm\Delta\phi) \tag{13}$$

then $\theta=(n+1/2)\pi-\phi/2$ or $\theta=(n+1/2)\pi+\Delta\phi/2$. In this area the absolute value of $\sin \theta$ is larger than the absolute value of $\sin$ (θ±Δφ). That is, the synchronous sinusoidal voltage Vref1 is larger than the leading sinusoidal voltage Vref4 and the lagging sinusoidal voltage Vref5. Thus, during this period the current-carrying thyristor cannot be applied a reverse bias voltage and turned off. Therefore, the period of the phase shift angle Δφ during the phase angle π is the percentage of the time that the thyristor cannot be turned off.

However, if in a shift range required to turn off the thyristor with a reverse bias voltage, the phase shift angle Δφ is sufficiently small compared with π, the time during which the thyristor cannot be turned off can be kept sufficiently short. Therefore, the effect of the delayed thyristor turn-off can be kept to the minimum. When the current detection means 19a detects that the current flowing through the AC switch 1 becomes zero, the phase shift type sinusoidal voltage selection means 19c outputs the synchronous sinusoidal voltage Vref1.

The configuration of the phase shift type reference sinusoidal voltage generation circuit 19 that realizes the above-described functions will be explained by referring to FIG. 5. In FIG. 5, the phase shift type sinusoidal voltage generation means 19b generates and outputs the synchronous sinusoidal voltage Vref1, the leading sinusoidal voltage Vref4, the lagging sinusoidal voltage Vref5 and the cosine wave voltage V cos. More specifically, the phase shift type sinusoidal voltage generation means 19b may be realized with a PLL circuit. A first selection circuit 19c1 that forms a part of the phase shift type sinusoidal voltage selection means 19c selects the leading sinusoidal voltage Vref4 when the product of the current output from the current detection means 19a and the cosine wave voltage V cos is positive and the lagging sinusoidal voltage Vref5 when the product of the current output from current detection means and V cos is negative. When the power failure detection means 12 detects a power outage and the current detection means 19a detects that the current is not zero, a first decision circuit 19c2 decides that the output voltage of the first selection circuit 19c1 is required for the reference sinusoidal voltage. Upon receiving from the first decision circuit 19c2 a signal indicating that the output voltage of the first selection circuit 19a1 is required, a second selection circuit 19c3 selects the output voltage of the first selection circuit 19c1. When the signal is not received, the second selection circuit 19c3 selects the synchronous sinusoidal voltage Vref1.

FIG. 7A shows an example logic circuit of the first selection circuit 19c1 of FIG. 5. Input signals to the first selection circuit 19c1 of FIG. 5 are V cos, Vref4 and Vref5. Generated from these signals are input signals BV and BV cos to the logic circuit of FIG. 7A, and a same polarity signal X. These input signals BV, BV cos go High when the synchronous sinusoidal voltage Vref1 and the cosine wave voltage V cos are positive, respectively. The input signals BV and BV cos are also pulsed logic signals that go Low when the synchronous sinusoidal voltage Vref1 and the cosine wave voltage V cos are negative, respectively. The same polarity signal X goes High when the signs of the synchronous sinusoidal voltage Vref1 and the current I flowing through the thyristor are the same and goes Low when they are opposite. The logic diagram of FIG. 7A can be expressed by the following logic equation.

$$Y=[(BV \cdot BV \cos + NBV \cdot NBV \cos)] \cdot X + [(BV \cdot NBV \cos + NBV \cdot BV \cos)] \cdot NX \quad (14)$$

It is noted, however, that a logic variable attached with a sign N at the head indicates a NOT of subsequent logic variables. In the embodiment of FIG. 7 described below, however, all V's mean Vref1. AND is represented by a symbol "·" and OR by "+", When I·V>0, then X=High. At this time, the terms in the first parentheses in the right-hand member of equation (14) remain. If in this equation (14) V·V cos>0, then V>0 and V cos>0 or V<0 and V cos<0, so that the first term or second term in the first parentheses goes High. With the terms in the first parentheses being High, Y goes High. Because we are considering a case where I·V>0, Y goes High when I·V cos>0. This matches the condition of the first decision circuit described earlier. When I·V<0. X goes Low. At this time, the terms in the second parentheses in the right-hand member of equation (14) remain. The terms in the second parentheses or Y goes High when V·V cos<0. Because I·V<0, Y goes High when I·V cos>0. This condition also matches that for the first decision circuit described earlier. From the foregoing explanation, it follows that Y goes High when I·V cos>0 irrespective of the sign of I·V. Here, the leading sinusoidal voltage Vref4 is selected when the output of the decision circuit of FIG. 7 is High; and when the output is Low, the lagging sinusoidal voltage Vref5 is chosen.

FIG. 7B shows another example of a logic circuit of the first selection circuit 19c1 of FIG. 5. The first selection circuit 19c1 receives pulsed logic signals BV cos and BI at its inputs which go High when the cosine wave voltage V cos and the current I flowing through the thyristor are positive, respectively, and which go Low when they are negative. Although the block diagram of FIG. 5 does not show these logical input signals, they can be derived from the input signals I and V cos shown in the figure. The logic diagram of FIG. 7B may be expressed by the following logic equation.

$$Y=BI \cdot BV \cos + NBI \cdot NBV \cos \quad (15)$$

Here, in equation (15) when I>0 and V cos>0, the first term goes High; and when I<0 and V cos<0, the second term goes High. Hence, in equation (15) Y becomes High when I·V cos >0. This matches the condition of the first decision circuit described earlier. Here, when the output of the decision circuit of FIG. 7B is High, the leading sinusoidal voltage Vref4 is selected; and when the output is Low, the lagging sinusoidal voltage Vref5 is selected.

While the embodiments of the present invention have been described for a single phase, this invention can of course be applied to three-phase power supplies, too.

Figure 8B:
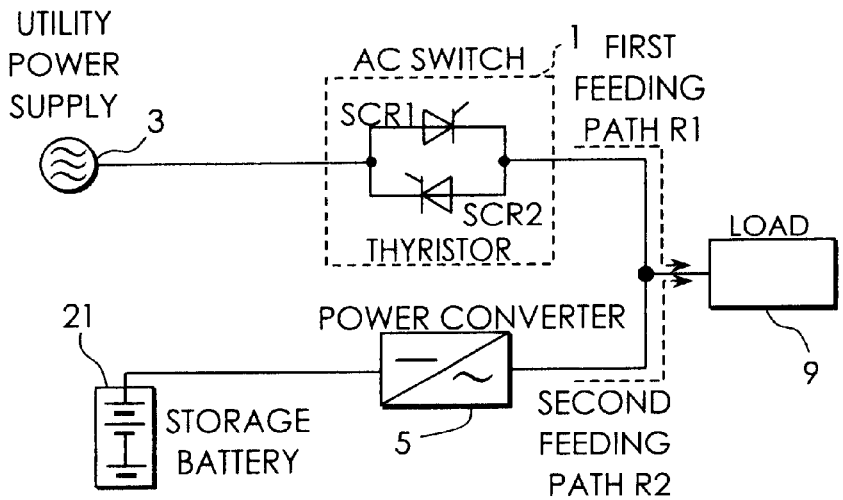

FIG. 8B shows a configuration of an uninterruptible power supply to which the present invention can be applied. In the uninterruptible power supply shown in the figure, the utility power supply 3 normally feeds the load 9 through the first feeding path R1. If the utility power supply 3 should fail, a DC power from a storage battery 21 is converted by the power converter 5 into an AC power before being fed to the load 9 through the second feeding path R2. At this time the power converter 5 operates as an inverter. In this uninterruptible power supply, too, during a power failure the first feeding path R1 is switched over to the second feeding path R2, so that the AC switch 1 must be turned off quickly.

Figure 8C:
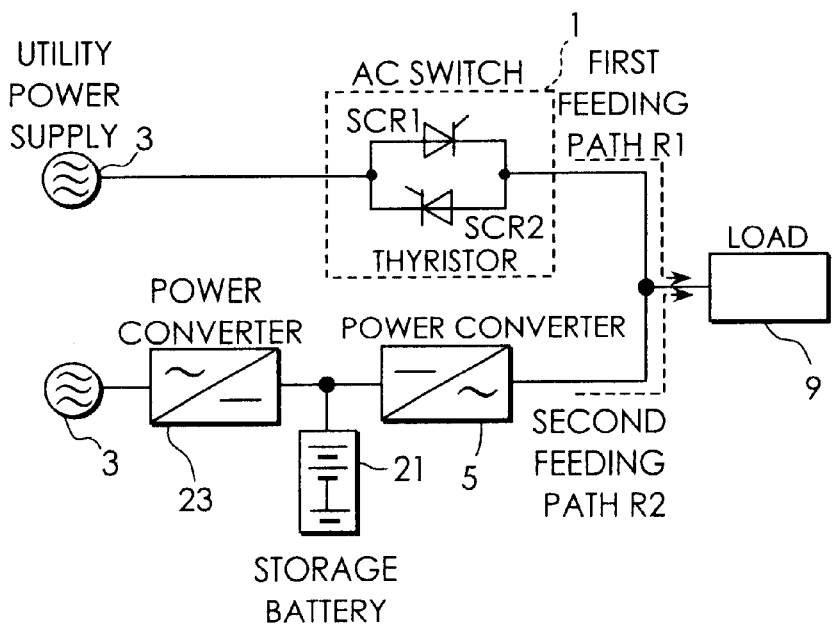

FIG. 8C shows a configuration of another uninterruptible power supply to which the present invention can be applied. In the uninterruptible power supply shown here, an AC power from the utility power supply 3 is converted by a power converter 23 into a DC power which is used to charge a storage battery 21 and the DC output of the power converter 23 is converted by the power converter 5 into an AC power which is then fed to the load 9 during a normal condition. This equipment is called a normally inverter feeding method. With this equipment, in the event of a failure of the second feeding path R2, the AC switch turns on feeding the load through the first feeding path R1. When, after the recovery of the second feeding path R2, the first feeding path R1 is switched over to the second feeding path R2, the AC switch 1 is turned off. In either of the uninterruptible power supplies of FIG. 8B and FIG. 8C, the configuration of this invention for turning off the AC switch 1 used in the first and second embodiment shown in FIG. 1 through FIG. 7 can be adopted to turn off the AC switch 1 instantaneously.

According to the present invention, in the event that the utility power supply falls, since the reference sinusoidal voltage generation circuit generates a reference sinusoidal voltage that sets an output voltage of the power converter to such a level as can apply a reverse bias to a conducting one of the thyristors making up the AC switch, the AC switch can be turned off quickly without having to provide a special, forced thyristor turn-off circuit. Particularly, the invention as defined in claim 1 offers an advantage that during the process of turning off the AC switch, there exists no period of time when the utility power supply and the power converter are paralleled, thus preventing a cross current from flowing between the utility power supply and the power converter.

The present invention is not limited to these embodiments, but various variations and modifications may be made without departing from the scope of the present invention.

What is claimed is:

1. An uninterruptible power supply comprising:
   a first feeding path to feed an AC power to a load from a utility power supply through an AC switch made up of a pair of antiparallelly connected thyristors;
   a second feeding path including a voltage control type power converter, the power converter using a DC power supply as its source and performing an inverter operation of converting a DC power into an AC power and feeding the converted AC power to the load;
   a reference sinusoidal voltage generation circuit to produce a reference sinusoidal voltage; and
   a control command generation means to, based on the reference sinusoidal voltage, output to the power converter a voltage control command to cause the power converter to perform the inverter operation, wherein, while the voltage control command is being output from the control command generation means, the AC switch is turned off and the feeding of the AC power to the load is switched over from the first feeding path to the second feeding path;
   wherein the reference sinusoidal voltage generation circuit includes:
      a sinusoidal voltage generation means to generate a synchronous sinusoidal voltage Vref1, a high synchronous sinusoidal voltage Vref2 and a low synchronous sinusoidal voltage Vref3, wherein the synchronous sinusoidal voltage Vref1 is synchronized with the utility power supply and, when used as the reference sinusoidal voltage, causes an output voltage of the power converter to become almost equal to a voltage of the utility power supply, the high synchronous sinusoidal voltage Vref2 is in phase with the synchronous sinusoidal voltage Vref1 and higher in amplitude than the synchronous sinusoidal voltage Vref1, and the low synchronous sinusoidal voltage Vref3 is in phase with the synchronous sinusoidal voltage Vref1 and lower in amplitude than the synchronous sinusoidal voltage Vref1;
      a current detection means to detect a current flowing through the AC switch; and
      a sinusoidal voltage selection means to select the synchronous sinusoidal voltage Vref1, the high synchronous sinusoidal voltage Vref2 or the low synchronous sinusoidal voltage Vref3 and output the selected voltage as the reference sinusoidal voltage to the control command generation means, wherein when the voltage control command is not output, the sinusoidal voltage selection means selects the synchronous sinusoidal voltage Vref1 and wherein when the voltage control command is output, the sinusoidal voltage selection means selects the high synchronous sinusoidal voltage Vref2 if an output of the current detection means has a positive polarity, selects the low synchronous sinusoidal voltage Vref3 if the output of the current detection means has a negative polarity, and selects the synchronous sinusoidal voltage Vref1 if the output of the current detection means is zero.

2. An uninterruptible power supply according to claim 1, wherein when the utility power supply fails, the control command generation means outputs the voltage control command.

3. An uninterruptible power supply according to claim 1, wherein when the power converter is normal, the control command generation means outputs the voltage control command at all times, and wherein, when the power converter is abnormal, the AC switch is controlled to conduct.

4. An uninterruptible power supply according to claim 1, wherein the control command generation means outputs the voltage control command to the power converter when the utility power supply falls and, when the utility power supply is normal, outputs a current control command to the power converter to cause the power converter to operate as an active filter.

5. An uninterruptible power supply comprising:
   a power failure detection means to detect a power failure in a utility power supply;
   an AC switch having a pair of antiparallelly connected thyristors, the AC switch being adapted to conduct to feed an AC power from the utility power supply to a load when the utility power supply is normal and, the AC Switch being turned off when the utility power supply fails;
   a DC power supply;
   a voltage control type power converter arranged between the AC switch and the DC power supply, wherein when the utility power supply is normal, the power converter performs a rectifier operation of converting the AC power from the utility power supply into a DC power and charging the DC power supply with the DC power and performs an active filter operation of compensating for a harmonic current and a reactive current flowing into the load and wherein at other times the power converter uses the DC power supply as its source and performs mainly an inverter operation of converting a DC power into an AC power and feeding the converted AC power to the load;
   a reference sinusoidal voltage generation circuit to produce a reference sinusoidal voltage; and
   a control command generation means to, based on the reference sinusoidal voltage, output to the power converter a voltage control command to cause the power converter to perform the inverter operation and a current control command to cause the power converter to perform the rectifier operation and the active filter operation;

wherein the reference sinusoidal voltage generation circuit includes;
  a sinusoidal voltage generation means to generate a synchronous sinusoidal voltage Vref1, a high synchronous sinusoidal voltage Vref2 and a low synchronous sinusoidal voltage Vref3, wherein the synchronous sinusoidal voltage Vref1 is synchronized with the utility power supply and, when used as the reference sinusoidal voltage, causes an output voltage of the power converter to become almost equal to a voltage of the utility power supply, the high synchronous sinusoidal voltage Vref2 is in phase with the synchronous sinusoidal voltage Vref1 and higher in amplitude than the synchronous sinusoidal voltage Vref1, and the low synchronous sinusoidal voltage Vref3 is in phase with the synchronous sinusoidal voltage Vref1 and lower in amplitude than the synchronous sinusoidal voltage Vref1;
  a current detection means to detect a current flowing through the AC switch; and
  a sinusoidal voltage selection means to select the synchronous sinusoidal voltage Vref1, the high synchronous sinusoidal voltage Vref2 or the low synchronous sinusoidal voltage Vref3 and output the selected voltage as the reference sinusoidal voltage to the control command generation means, wherein when the power failure detection means does not detect a power failure and the voltage control command is not output, the sinusoidal voltage selection means selects the synchronous sinusoidal voltage Vref1 and wherein when the power failure detection means detects a power failure and the voltage control command is output, the sinusoidal voltage selection means selects the high synchronous sinusoidal voltage Vref2 if an output of the current detection means has a positive polarity, selects the low synchronous sinusoidal voltage Vref3 if the output of the current detection means has a negative polarity, and selects the synchronous sinusoidal voltage Vref1 if the output of the current detection means is zero.

6. An uninterruptible power supply according to claim 1, wherein the sinusoidal voltage generation means generates the synchronous sinusoidal voltage Vref1, a high synchronous sinusoidal voltage Vref2 in phase with the synchronous sinusoidal voltage Vref1 and a voltage difference command value ΔV higher than the synchronous sinusoidal voltage Vref1, and a low synchronous sinusoidal voltage Vref3 in phase with the synchronous sinusoidal voltage Vref1 and the voltage difference command value ΔV lower than the synchronous sinusoidal voltage Vref1.

7. An uninterruptible power supply according to claim 5, wherein the sinusoidal voltage selection means comprises;
  a first selection circuit to select the high synchronous sinusoidal voltage Vref2 when the output of the current detection means has a positive polarity and the low synchronous sinusoidal voltage Vref3 when the output of the current detection means has a negative polarity;
  a first decision circuit to decide that an output voltage of the first selection circuit is required as the reference sinusoidal voltage when the power failure detection means detects a power failure and the current detection means detects that the current is not zero; and
  a second selection circuit to select the output voltage of the first selection circuit when the first decision circuit decides that the output voltage of the first selection circuit is required and, at other times, select the synchronous sinusoidal voltage Vref1.

8. An uninterruptible power supply comprising:
  a power failure detection means to detect a power failure in a utility power supply;
  an AC switch having a pair of antiparallelly connected thyristors, the AC switch being adapted to conduct to feed an AC power from the utility power supply to a load when the utility power supply is normal and, the AC Switch being turned off when the utility power supply fails;
  a DC power supply;
  a voltage control type power converter arranged between the AC switch and the DC power supply, wherein when the utility power supply is normal, the power converter performs a rectifier operation of converting the AC power from the utility power supply into a DC power and charging the DC power supply with the DC power and performs an active filter operation of compensating for a harmonic current and a reactive current flowing into the load and wherein at other times the power converter uses the DC power supply as its source and performs mainly an inverter operation of converting a DC power into an AC power and feeding the converted AC power to the load;
  a phase shift type reference sinusoidal voltage generation circuit to produce a reference sinusoidal voltage; and
  a control command generation means to, based on the reference sinusoidal voltage, output to the power converter a voltage control command to cause the power converter to perform the inverter operation and a current control command to cause the power converter to perform the rectifier operation and the active filter operation;
wherein the phase shift type reference sinusoidal voltage generation circuit comprises:
  a phase shift type sinusoidal voltage generation means to generate a synchronous sinusoidal voltage Vref1, a leading sinusoidal voltage Vref4 and a lagging sinusoidal voltage Vref5, wherein the synchronous sinusoidal voltage Vref1 is synchronized with the utility power supply and, when used as the reference sinusoidal voltage, causes an output voltage of the power converter to become almost equal in amplitude to a voltage of the utility power supply, the leading sinusoidal voltage Vref4 is equal in amplitude to and leading in phase the synchronous sinusoidal voltage Vref1, and the lagging sinusoidal voltage Vref5 is equal in amplitude to and lagging in phase the synchronous sinusoidal voltage Vref1;
  a current detection means to detect a current flowing through the AC switch; and
  a phase shift type sinusoidal voltage selection means to select the synchronous sinusoidal voltage Vref1, the leading sinusoidal voltage Vref4 or the lagging sinusoidal voltage Vref5 and output the selected voltage as the reference sinusoidal voltage to the control command generation means, wherein when the power failure detection means does not detect a power failure and the voltage control command is not output, the phase shift type sinusoidal voltage selection means selects the synchronous sinusoidal voltage Vref1 and wherein when the power failure detection means detects a power failure and the voltage control command is output, the phase shift type sinusoidal voltage selection means selects the leading sinusoidal voltage Vref4 or the lagging sinusoidal voltage Vref5, whichever is larger than the synchronous sinusoidal voltage Vref1 if an output of the current detection means has a positive polarity, selects the leading sinusoidal voltage Vref4 or the lagging sinusoidal voltage Vref5, whichever is smaller than the synchronous sinusoidal voltage the if the output of the current detection means has a negative polarity, and selects the synchronous sinusoidal voltage Vref1 if the output of the current detection means is zero.

9. An uninterruptible power supply according to claim 8, wherein the phase shift type sinusoidal voltage generation means generates the synchronous sinusoidal voltage Vref1, the leading sinusoidal voltage Vref4 equal in amplitude to and leading the synchronous sinusoidal voltage Vref1 by a phase difference command value $\Delta\phi$, and the lagging sinusoidal voltage Vref5 equal in amplitude to and lagging the synchronous sinusoidal voltage Vref1 by the phase difference command value $\Delta\phi$.

10. An uninterruptible power supply according to claim 8, wherein the phase shift type sinusoidal voltage selection means selects the leading sinusoidal voltage Vref4, the lagging sinusoidal voltage Vref5 or the synchronous sinusoidal voltage Vref1 and outputs the selected voltage as the reference sinusoidal voltage to the control command generation means, wherein the phase shift type sinusoidal voltage selection means selects the leading sinusoidal voltage Vref4 after the current has changed from the negative polarity to the positive polarity until the synchronous sinusoidal voltage Vref1 reaches a positive peak value, selects the lagging sinusoidal voltage Vref5 after the synchronous sinusoidal voltage has reached the positive peak value until the current changes from the positive polarity to the negative polarity, selects the leading sinusoidal voltage Vref4 after the current has changed from the positive polarity to the negative polarity until the synchronous sinusoidal voltage reaches a negative peak value, selects the lagging sinusoidal voltage Vref5 after the synchronous sinusoidal voltage has reached the negative peak value until the current changes from the negative polarity to the positive polarity, and selects the synchronous sinusoidal voltage Vref1 when the current detection means detects that the current is zero.

11. AC switch turn-off method for an uninterruptible power supply, wherein the uninterruptible power supply has a first feeding path to feed an AC power to a load from a utility power supply through an AC switch made up of a pair of antiparallelly connected thyristors and a second feeding path including a voltage control type power converter, the power converter using a DC power supply as its source and performing an inverter operation of converting a DC power into an AC power and feeding the converted AC power to the load, the method comprising the step of:

when the power feeding to the load is switched over from the first feeding path to the second feeding path, applying a reverse bias voltage from the power converter to a conducting one of the thyristors to forcibly turn off the conducting thyristor.

12. An uninterruptible power supply according to claim 5, wherein the sinusoidal voltage generation means generates the synchronous sinusoidal voltabe Vref1, a high synchronous sinusoidal voltage Vref2 in phase with $\Delta V$ the synchronous sinusoidal voltage Vref1 and a voltage difference command value higher than the synchronous sinusoidal voltage Vref1, and a low synchronous sinusoidal voltage Vref3 in phase with the synchronous sinusoidal voltage Vref1 and the voltage difference command value $\Delta V$ lower than the synchronous sinusoidal voltage Vref1.

* * * * *

UNITED STATES PATENT AND TRADEMARK OFFICE
CERTIFICATE OF CORRECTION

PATENT NO. : 6,556,459 B2
DATED : April 29, 2003
INVENTOR(S) : Okui et al.

It is certified that error appears in the above-identified patent and that said Letters Patent is hereby corrected as shown below:

Column 9,
Line 3, delete "lie" and insert -- 11c --.

Column 11,
Lines 45 and 67, delete "V cos" and insert -- Vcos --.

Column 12,
Line 11, delete "Vref1 sin $\theta$" and insert -- Vref1 $\alpha$ sin $\theta$ --.
Line 13, delete "Vref4 sin ($\theta+\Delta\Phi$)" and insert -- Vref4 $\alpha$ sin ($\theta+\Delta\Phi$) --.
Line 15, delete "Vref5 sin ($\theta-\Delta\Phi$)" and insert -- Vref1 $\alpha$ sin ($\theta-\Delta\Phi$) --.
Line 40, delete "1x(Vref4-Vref5) 2I·sin($\Delta\Phi$)·cos $\theta$" and insert
-- 1x(Vref4-Vref5) $\alpha$ 2I·sin($\Delta\Phi$)·cos $\theta$ --.
Line 42, delete "V cos·I" and insert -- $\alpha$ Vcos·I --.
Line 45, delete "V cos cos $\theta$" and insert -- Vcos $\alpha$ cos $\theta$ --.
Line 58, delete "V cos·I>0" and insert -- Vcos·I > 0 --.

Column 13,
Lines 25, 31, 33, 47, 52 and 55, delete "V cos" and insert -- Vcos --.
Lines 50 and 53, "BV cos" and insert -- BVcos --.
Line 61, delete "Y=[(BV·BV cos+NBV·NBV cos)] ·X+
[(BV·NBV cos+NBV·BV cos)] ·NX" and insert -- Y=[(BV·
Bvcos + NBV·NBVcos)] ·X + [(BV·NBVcos +NBV·BVcos)]·NX --.

Column 14,
Line 4, delete "V cos" (first occurrence) and insert -- Vcos --.
Line 4, delete "V cos" (second occurrence) and insert -- Vcos --.
Lines 8, 12, 13 and 16, delete "V cos" and insert -- Vcos --.

UNITED STATES PATENT AND TRADEMARK OFFICE
CERTIFICATE OF CORRECTION

PATENT NO. : 6,556,459 B2
DATED : April 29, 2003
INVENTOR(S) : Okui et al.

It is certified that error appears in the above-identified patent and that said Letters Patent is hereby corrected as shown below:

<u>Column 14 cont'd,</u>
Line 23, delete "BV cos" and insert -- BVcos --.
Lines 29, 34, 35 and 37, delete "V cos" and insert -- Vcos --.
Line 32, delete "Y=BI·BV cos+NBI·NBV cos" and insert
-- Y=BI·BVcos + NBI·NBVcos --.

Signed and Sealed this

Sixteenth Day of September, 2003

JAMES E. ROGAN
*Director of the United States Patent and Trademark Office*